(12) United States Patent
Sasaki

(10) Patent No.: US 10,389,131 B2
(45) Date of Patent: Aug. 20, 2019

(54) POWER CONTROL APPARATUS, POWER CONTROL METHOD, AND POWER CONTROL SYSTEM

(71) Applicant: KYOCERA CORPORATION, Kyoto-shi, Kyoto (JP)

(72) Inventor: Yasushi Sasaki, Yokohama (JP)

(73) Assignee: KYOCERA Corporation, Kyoto (JP)

(*) Notice: Subject to any disclaimer, the term of this patent is extended or adjusted under 35 U.S.C. 154(b) by 131 days.

(21) Appl. No.: 15/306,433

(22) PCT Filed: Apr. 24, 2015

(86) PCT No.: PCT/JP2015/002246
§ 371 (c)(1),
(2) Date: Oct. 24, 2016

(87) PCT Pub. No.: WO2015/162940
PCT Pub. Date: Oct. 29, 2015

(65) Prior Publication Data
US 2017/0047738 A1    Feb. 16, 2017

(30) Foreign Application Priority Data
Apr. 24, 2014   (JP) .................... 2014-090639

(51) Int. Cl.
  *H02J 3/38*    (2006.01)
  *H02J 7/00*    (2006.01)
  (Continued)

(52) U.S. Cl.
  CPC .............. *H02J 3/383* (2013.01); *H02J 3/387* (2013.01); *H02J 7/0052* (2013.01);
  (Continued)

(58) Field of Classification Search
  CPC .......... H02J 3/383; H02J 3/387; H02J 7/0052; H02M 7/44
  (Continued)

(56) References Cited

U.S. PATENT DOCUMENTS

2009/0305087 A1* 12/2009 Rajashekara ...... H01M 8/04611
                                                            429/423
2014/0152097 A1*  6/2014 Kitaji ........................ H02J 1/10
                                                            307/19
2016/0315474 A1   10/2016 Satake

FOREIGN PATENT DOCUMENTS

CN    105794071 A    7/2016
EP    2 988 388 A1   2/2016
(Continued)

OTHER PUBLICATIONS

Extended European Search Report dated Nov. 7, 2017, issued by the European Patent Office in counterpart European Patent Application No. 15 783 046.4.
(Continued)

*Primary Examiner* — Rexford N Barnie
*Assistant Examiner* — Elim Ortiz
(74) *Attorney, Agent, or Firm* — Procopio Cory Hargreaves and Savitch LLP

(57) ABSTRACT

A power control apparatus used in a power control system provided with a fuel cell which generates power while a current sensor is detecting forward power flow, a solar cell, and a storage battery comprises a pseudo-output unit configured to generate a pseudo current to be detected by the current sensor; and a controller configured to control the pseudo-output unit. The controller acquires at least one of a charge level of the storage battery and an output value of the solar cell and, based on at least one of the charge level and the output value, adjusts the pseudo current detected by the
(Continued)

current sensor to control a power generation amount of the fuel.

19 Claims, 9 Drawing Sheets

(51) Int. Cl.
    *H02M 7/44* (2006.01)
    *H02J 7/35* (2006.01)
(52) U.S. Cl.
    CPC .............. *H02J 7/0055* (2013.01); *H02J 7/35* (2013.01); *H02M 7/44* (2013.01); *Y02B 10/14* (2013.01); *Y02E 10/563* (2013.01); *Y02E 10/566* (2013.01); *Y02P 80/23* (2015.11); *Y02P 90/40* (2015.11); *Y02P 90/50* (2015.11)
(58) Field of Classification Search
    USPC ......................................................... 307/19
    See application file for complete search history.

(56) References Cited

FOREIGN PATENT DOCUMENTS

| | | |
|---|---|---|
| EP | 3 079 216 A1 | 10/2016 |
| JP | 2013-051879 A | 3/2013 |
| JP | 2013-115871 A | 6/2013 |
| JP | 2013-243794 A | 12/2013 |
| JP | 2014-072144 A | 4/2014 |
| JP | 2014-072930 A | 4/2014 |
| JP | 2014-073010 A | 4/2014 |

OTHER PUBLICATIONS

International Search Report and Written Opinion of the International Searching Authority issued by the Japanese Patent Office for International Application No. PCT/JP2015/002246.

* cited by examiner

POWER CONTROL APPARATUS, POWER CONTROL METHOD, AND POWER CONTROL SYSTEM

CROSS REFERENCE TO RELATED APPLICATION

The present application is a 371 National Stage of PCT Application No. PCT/JP2015/002246 filed on 24 Apr. 2015, which claims priority to and the benefit of Japanese Patent Application No. 2014-90639 filed on Apr. 24, 2014, the entire contents of which are incorporated herein by reference.

TECHNICAL FIELD

This disclosure relates to a power control apparatus for controlling a plurality of distributed power sources, a power control method, and a power control system.

BACKGROUND

For example, PLT 1 set forth below discloses a power supply system as a system for controlling a plurality of distributed power sources, the power supply system provided with a power generation apparatus for supplying generated power to a power load, a storage battery for supplying power to the power load, a power measuring apparatus for measuring the power supplied to the power load from the storage battery, and a controller. In this power supply system, during a period in which the power load is consuming the power, the controller controls the power generation apparatus and the storage battery such that the power measured by the power measuring apparatus meets a value of predetermined power larger than zero.

CITATION LIST

Patent Literature

PLT 1: JP-A-2013-243794

SUMMARY

Technical Problem

In using the power generation apparatus and the storage battery as the distributed power sources, it is assumed that a plurality of power generation apparatuses such as a solar cell, a fuel cell, and the like are used as the power generation apparatuses. In this case, central management and operation of the plurality of distributed power sources such as the solar cell, the fuel cell, the storage battery, and the like is desired.

However, the fuel cell, due to its nature, exhibits a sufficient followability to control to reduce a power generation amount and insufficient followability to control to increase the power generation amount. Also, since the fuel cell uses fuel, it is desirable to operate the fuel cell in a highly economical manner by suppressing an output (the power generation amount). Therefore, in such a power supply system, there is a concern that, in case of that the storage battery cannot cover the power of the load due to a rapid decrease in the output of the solar cell or a sharp increase in the load, limiting the power generation amount of the fuel cell when a charge level of the storage battery (a battery power level) is low may render the power generation amount of the fuel cell unable to follow the increase and thus make the load unusable.

Accordingly, it could be helpful to provide a power control apparatus which appropriately controls operations of the distributed power sources and thus is capable of stably supplying power to the load, a power control method, and a power control system.

Solution to Problem

In order to solve the above problem, a power control apparatus according to the disclosure herein is a power control apparatus used in a power control system provided with a fuel cell which generates power while a current sensor is detecting forward power flow, a solar cell, and a storage battery, the power control apparatus includes:
a pseudo-output unit configured to generate a pseudo current to be detected by the current sensor; and
a controller configured to control the pseudo-output unit, wherein
the controller acquires at least one of a charge level of the storage battery and an output value of the solar cell and, based on at least one of the charge level and the output value, together with the pseudo current detected by the current sensor, controls a power generation amount of the fuel cell.

Further, a power control method of the disclosure herein is a power control method of a power control system provided with a controller for controlling a fuel cell which generates power while a current sensor is detecting forward power flow, a solar cell, and a storage battery, and also controlling a pseudo-output unit configured to generate a pseudo current to be detected by the current sensor, the power control method includes:
a first step of acquiring at least one of a charge level of the storage battery and an output value of the solar cell; and
a second step of controlling a power generation amount of the fuel cell based on at least one of the charge level and the output value, together with the pseudo current detected by the current sensor.

A power control system according to one embodiment of the disclosure herein is a power control system provided with a controller for controlling a fuel cell which generates power while a current sensor is detecting forward power flow, a solar cell, and a storage battery, and also controlling a pseudo-output unit configured to generate a pseudo current to be detected by the current sensor, wherein
the controller, in a state being parallel-off from a grid, controls a power generation amount of the fuel cell based on at least one of a charge level of the storage battery and an output value of the solar cell, together with the pseudo current detected by the current sensor.

Advantageous Effect

According to the disclosure herein, operations of a plurality of distributed power sources are appropriately controlled, and power may be stably supplied to a load.

BRIEF DESCRIPTION OF THE DRAWINGS

In the accompanying drawings.

DETAILED DESCRIPTION

First Embodiment

Figure 1:
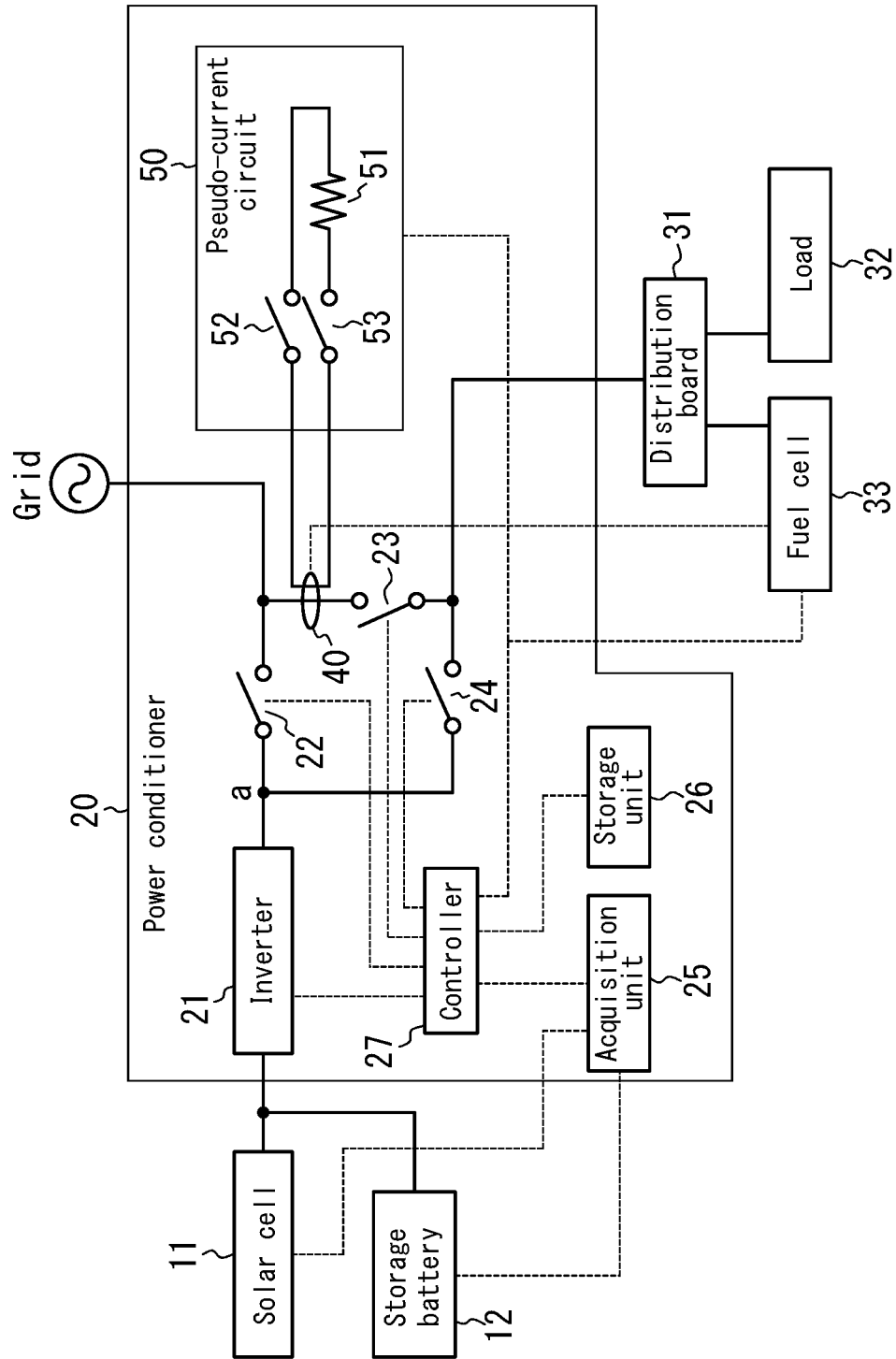
FIG. 1 is a block diagram illustrating a schematic configuration of a power control system according to a first embodiment.

FIG. 1 is a block diagram illustrating a schematic configuration of a power control system according to a first embodiment of the disclosure herein. The power control system illustrated in FIG. 1 includes a solar cell 11, a storage battery 12, a power conditioner (a power control apparatus) 20, a distribution board 31, a load 32, and a fuel cell 33. Here, the fuel cell 33 is, for example, SOFC (Solid Oxide Fuel Cell) or the like.

Typically, the power control system performs an interconnection operation with a grid (a commercial power line) and supplies power from the grid and power from each of distributed power sources (the solar cell 11, the storage battery 12, and the fuel cell 33) to the load 32. Also, the power control system performs an independent operation when there is no power supply from the grid due to power outage and the like and supplies the power from each of the distributed power sources to loads (the load 32 and a pseudo-current load 51). Note that, when the power control system performs the independent operation, each distributed power source is parallel-off from the grid and, when the power control system performs the interconnection operation, each distributed power source is parallel with the grid.

In FIG. 1, a solid line connecting each functional block indicates wiring for flowing the power, and a broken line connecting each functional block indicates flow of a control signal or information communicated. A communication indicated by the broken line may be either a wired communication or a radio communication. The communication of the control signal and the information in each hierarchy may employ various communication schemes. For example, the communication of the control signal and the information may employ a short-range communication scheme such as ZigBee® (ZigBee is a registered trademark in Japan, other countries, or both). Or, the communication of the control signal and the information may use various transmission media such as an infrared communication, a power line communication (PLC: Power Line Communication), and the like. Further, in each communication, on a lower layer including a physical layer suitable for the communication, various communication protocols such as, for example, ZigBee SEP 2.0 (Smart Energy Profile 2.0) and ECHONET Lite® (ECHONET Lite is a registered trademark in Japan, other countries, or both) defining a logical layer alone may be operated.

The solar cell 11 converts the solar energy into DC power. The solar cell 11 includes, for example, power generation units having photoelectric conversion cells connected in a matrix form and is configured to output a predetermined short-circuit current (e.g., 10 A). The solar cell 11 may be of any type such as a silicon-based polycrystalline solar cell, a silicon-based monocrystal solar cell, a thin-film solar cell such as CIGS, and the like, so long as being capable of performing photoelectric conversion.

The storage battery 12 is constituted by using a lithium-ion battery, a nickel hydrogen battery, or the like. The storage battery 12 may supply power by discharging charged electric power. Also, the storage battery 12 may charge power supplied from the grid, the solar cell 11, and, as described later, the fuel cell 33.

The power conditioner 20 converts DC power supplied from the solar cell 11 and the storage battery 12 and AC power supplied from the grid and the fuel cell 33, and performs switching control between the interconnection operation and the independent operation. The power conditioner 20 includes an inverter 21, interconnection operation switches 22 and 23, an independent operation switch 24, an acquisition unit 25, a storage unit 26, a controller 27 configured to control the power control system in its entirety, a current sensor 40, and a pseudo-current circuit (a pseudo-output unit) 50. Note that the interconnection operation switch 23 and the pseudo-current circuit 50 may be provided outside the power conditioner 20.

The inverter 21 is a bi-directional inverter and converts the DC power supplied from the solar cell 11 and the storage battery 12 into the AC power and the AC power supplied from the grid and the fuel cell 33 into the DC power. Note that, at an upstream of the inverter 21, a converter may be provided to boost the DC power from the solar cell 11 and the storage battery 12 to a certain voltage.

The interconnection operation switches 22 and 23 and the independent operation switch 24 are respectively constituted by using a relay, a transistor, or the like and controlled to be ON/OFF. As illustrated in the figure, the independent operation switch 24 is arranged between the fuel cell 33 and the storage battery 12. The interconnection operation switches 22 and 23 and the independent operation switch 24 are synchronously switched avoiding both of them being ON (or OFF) at the same time. In particular, when the interconnection operation switches 22 and 23 are ON, the independent operation switch 24 is synchronously OFF, and when the interconnection operation switches 22 and 23 are OFF, the independent operation switch 24 is synchronously ON. Synchronous control of the interconnection operation switches 22 and 23 and the independent operation switch 24 is implemented by means of hardware, i.e., by branching the wiring for transmitting the control signal to the interconnection operation switches 22 and 23 and connecting a branch thus obtained to the independent operation switch 24. Needless to say, each switch may be independently turned on or off in response to the same control signal. Further, the synchronous control of the interconnection operation switches 22 and 23 and the independent operation switch 24 may be implemented by means of software.

The acquisition unit 25 acquires an output value of the solar cell 11 and a charge level (a battery power level) of the storage battery 12 at appropriate timing. The output value and the charge level thus acquired are transmitted to the controller 27. The storage unit 26 is constituted by using, for example, a semiconductor memory or the like, and stores various information and a program for operating the power conditioner 20 and functions as a work memory. The storage unit 26 stores the output value and the charge level acquired by the acquisition unit 25 and also stores a table containing a power generation amount of the fuel cell 33 corresponding to the charge level.

The controller 27 is constituted by using, for example, a microcomputer and, based on an increase in a voltage of the grid, a state such as power outage, and the like, controls operations of the inverter 21, the interconnection operation switches 22 and 23, the independent operation switch 24, and the like. The controller 27, for the interconnection operation, turns on the interconnection operation switches 22 and 23 and turns off the independent operation switch 24. Also, the controller 27, for the independent operation, turns off the interconnection operation switches 22 and 23 and turns on the independent operation switch 24. Further, the controller 27, based on a latest output value of the solar cell 11 and a latest charge level of the storage battery 12 acquired by the acquisition unit 25, controls the inverter 21 and the pseudo-current circuit 50. The current sensor 40 and the pseudo-current circuit 50 will be described later.

The distribution board 31 separates the power supplied from the grid during the interconnection operation into a plurality of branches and allocates the power to the load 32. Also, the distribution board 31 separates the power supplied from a plurality of distributed power sources (the solar cell 11, the storage battery 12, and the fuel cell 33) into a plurality of branches and allocates the power to the load 32. Here, the load 32 is a power load which consumes power and may be any electric appliance such as, for example, an air conditioner, a microwave oven, and a television used in a house, or a machine such as air-conditioning equipment and lighting equipment used in a commercial or industrial facility.

The fuel cell 33 includes a cell for generating DC power by using hydrogen and utilizing a chemical reaction thereof with oxygen in the air, an inverter for converting thus generated DC power into AC power of 100 V or 200 V, and other auxiliaries. Here, the fuel cell serving as the fuel cell 33 is a system capable of supplying the AC power to the load 32 without passing through the power conditioner 20, and therefore does not necessarily need to be designed assuming a connection to the power conditioner 20 but may be a versatile system.

The fuel cell 33 generates power while the current sensor 40 is detecting forward power flow (current in a power-purchasing direction) and performs a load-following operation to follow the power consumption of the load 32 during power generation, a charge-level-following operation to follow the charge level of the storage battery 12, or a rated operation based on a predetermined rated power value. A following range during the load-following operation and the charge-level-following operation is, for example, 200 W to 700 W. The rated power value during the rated operation is, for example, 200 W or 700 W. The fuel cell 33 performs the load-following operation or the rated operation during the interconnection operation and the charge-level-following operation or the rated operation during the independent operation.

The current sensor 40 detects current flowing between the grid and the fuel cell 33. In Japan, since it is prescribed that the power generated by the fuel cell 33 cannot be sold, when the current sensor 40 detects backward flow (current in a power-selling direction) toward the grid, the fuel cell 33 stops the power generation. While the current sensor 40 is detecting the forward power flow, the fuel cell 33 is considered to be able to supply the power to the load 32 therefrom and performs the power generation during the load-following operation, the charge-level-following operation, or the rated operation. Note that, as described later, from the viewpoint of power consumption, the current sensor 40 is preferably disposed in the power conditioner 20 at a position to which the power generation of the fuel cell 33 does not flow current during the independent operation.

Here, the power control system of FIG. 1, in a state in which the fuel cell 33 and the storage battery 12 are parallel-off from the grid, flows a current (a pseudo-current) in the same direction as the forward power flow to the current sensor 40 via the pseudo-current circuit 50. Thereby, the power control system controls the fuel cell 33 to perform the charge-level-following operation or the rated operation and supplies the power generated by the fuel cell 33 to the load 32. The following is a detailed description of the control of the power generation of the fuel cell 33 by the pseudo current via the pseudo-current circuit 50.

The pseudo-current circuit 50 is capable of supplying, to the current sensor 40, the pseudo current in the same direction as the forward power flow. The pseudo-current circuit 50 is a system for receiving power supply from the power conditioner 20 and includes the pseudo-current load 51, a synchronous switch 52, and a pseudo-current control switch 53.

Figure 2:
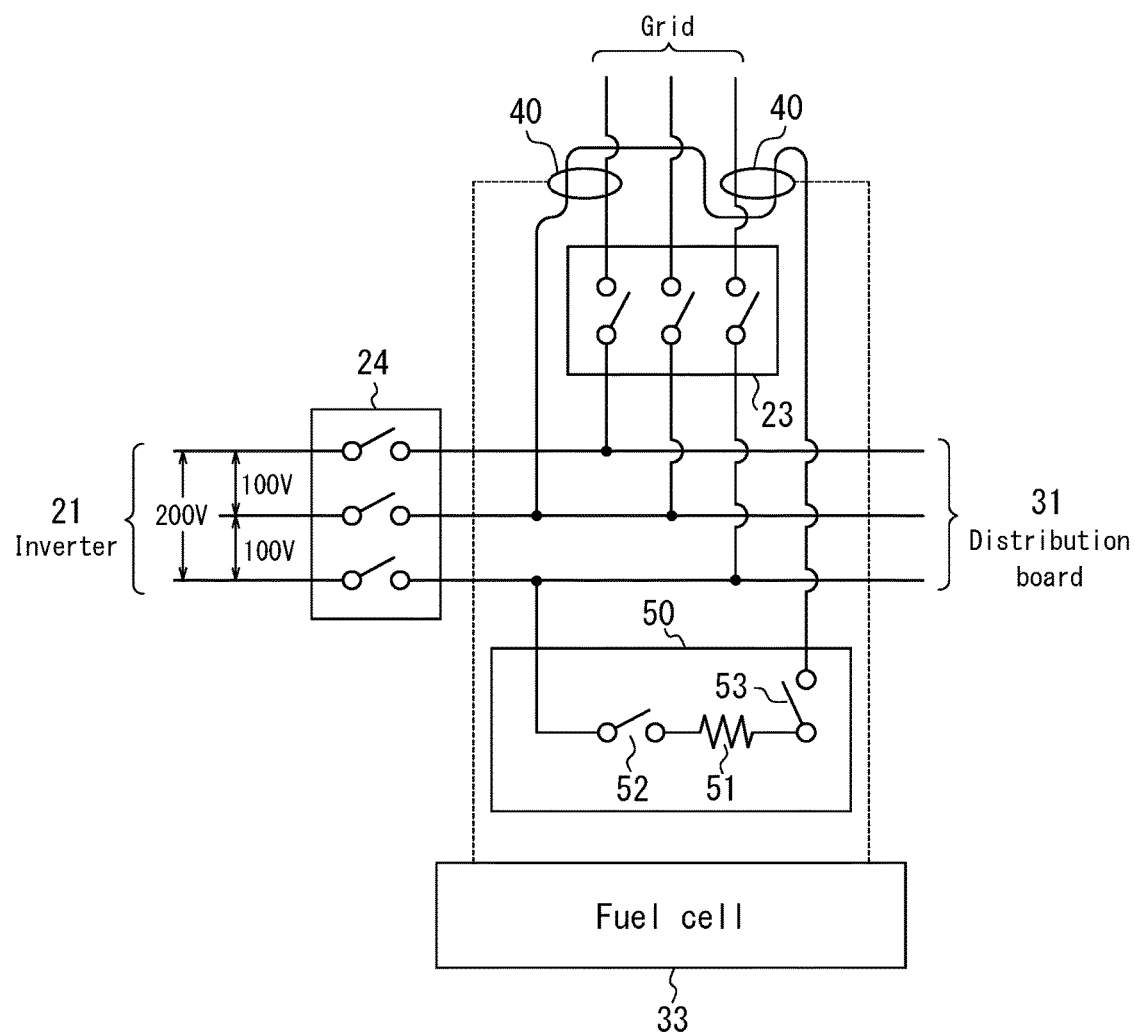
FIG. 2 is a diagram illustrating wiring of a pseudo-current circuit of FIG. 1.

FIG. 2 is a diagram illustrating wiring of the pseudo-current circuit 50. In FIG. 2, the grid uses a single-phase three-wire of 200 V. In this case, to the pseudo-current circuit 50, one of voltage lines and a neutral line are connected. As illustrated in the figure, connection lines of the pseudo-current circuit 50 are arranged passing through the current sensor 40 respectively installed on two voltage lines. Note that the pseudo-current circuit 50 may be integrally formed with, or independent of, the power conditioner 20.

The pseudo-current load 51 is a load appropriately provided for current adjustment in the pseudo-current circuit 50. A load external to the pseudo-current circuit 50 may be used as the pseudo-current load 51. Alternatively, the controller 27 controls the pseudo-current circuit 50 to flow the pseudo current in a direction opposite to the forward power flow and adjusts the pseudo current detected by the current sensor 40. The synchronous switch 52 functions to supply a portion of the power supplied to the pseudo-current circuit 50 from the power conditioner 20, as the pseudo current in the same direction as the forward power flow, to the current sensor 40. The pseudo-current control switch 53 functions to prevent unnecessary power generation by the fuel cell 33 caused by the pseudo current. The synchronous switch 52 and the pseudo-current control switch 53 are constituted by using respective relays, transistors, or the like and respectively turned on/off by the controller 27 of the power conditioner 20.

The synchronous switch 52 is turned on/off synchronously with the independent operation switch 24 of the power conditioner 20. That is, the synchronous switch 52, similarly to the independent operation switch 24, is OFF during the interconnection operation and ON during the independent operation. In particular, the synchronous switch 52 is switched synchronously with the switchover between the parallel-off of/parallel connection with the grid and flows the pseudo current during the parallel-off while refraining from flowing the pseudo current during the parallel connection with the grid. The synchronous control of the independent operation switch 24 and the synchronous switch 52 is implemented by means of hardware, i.e., by branching wiring for transmitting the control signal to the independent operation switch 24 and connecting a branch thus obtained to the synchronous switch 52. Note that the synchronous control of the independent operation switch 24 and the synchronous switch 52 may be implemented by means of software, i.e., by control of the controller 27.

The pseudo-current control switch 53 is OFF when charging of the storage battery 12 is completed and ON when the charging is not completed. Here, "when the charging of the storage battery 12 is completed" means when the storage battery 12 is charged at least to a predetermined value. Note that the controller 27 may be configured to determine, by communicating with the storage battery 12 via the acquisition unit 25, whether the charging is completed. When the charging of the storage battery 12 is completed during the independent operation and the pseudo-current control switch 53 is turned off, the pseudo current stops flowing to the current sensor 40. Therefore, the fuel cell 33 may stop unnecessary power generation.

Next, an example of control by the power control system of FIG. 1 will be described.

Figure 3:
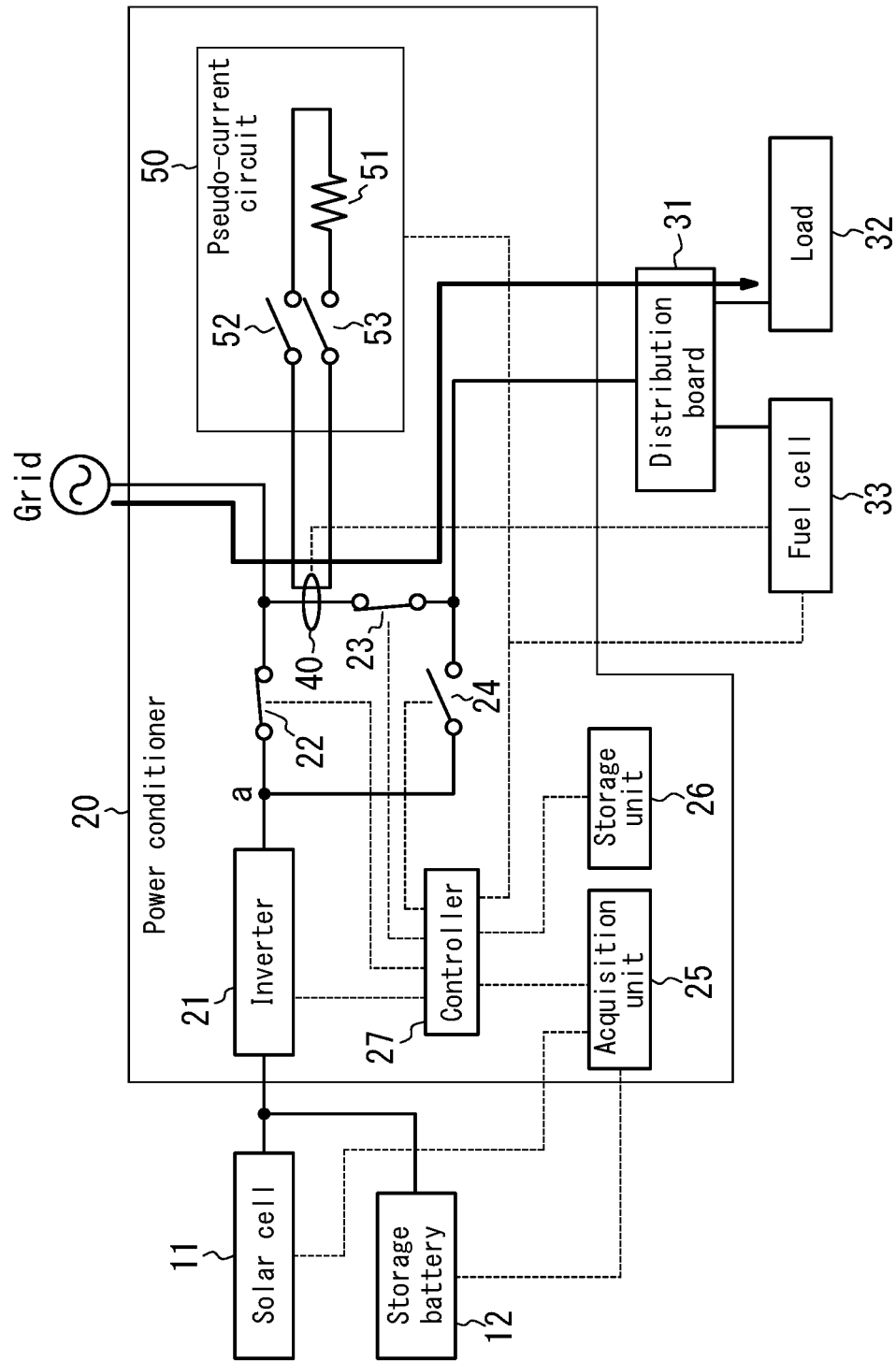
FIG. 3 is a diagram illustrating an example of control during an interconnection operation.

FIG. 3 is a diagram illustrating an example of the control by the power control system during the interconnection operation. In this case, each switch of the power conditioner 20 is controlled in such a manner that the interconnection operation switches 22 and 23 are ON, and the independent operation switch 24 is OFF. Also, each switch of the pseudo-current circuit 50 is controlled in such a manner that the synchronous switch 52 is OFF, and the pseudo-current control switch 53 is ON or OFF depending on the charge level of the storage battery 12.

During the interconnection operation, as indicated by a bold arrow, AC 100 V (or 200 V) is supplied to the load 32 from the grid. The power conditioner 20, when the charging of the storage battery 12 is not completed, converts the AC power from the grid into the DC power and charges the storage battery 12. Also, the power conditioner 20 may convert the power generated by the solar cell 11 into the AC power and inversely flow the AC power to the grid, or sell excessive power. Although the power conditioner 20 is configured to be able to output the power from the grid and the power from the distributed power sources (the solar cell 11 and the storage battery 12) to the pseudo-current circuit 50, since the synchronous switch 52 is OFF during the interconnection operation, the pseudo current is not supplied to the current sensor 40. The forward power (current in the power-purchasing direction) flows to the current sensor 40 from the grid. Thereby, the fuel cell 33 performs the load-following operation while the power generation amount thereof is limited, and supplies the power to the load 32 via the distribution board 31.

Figure 4:
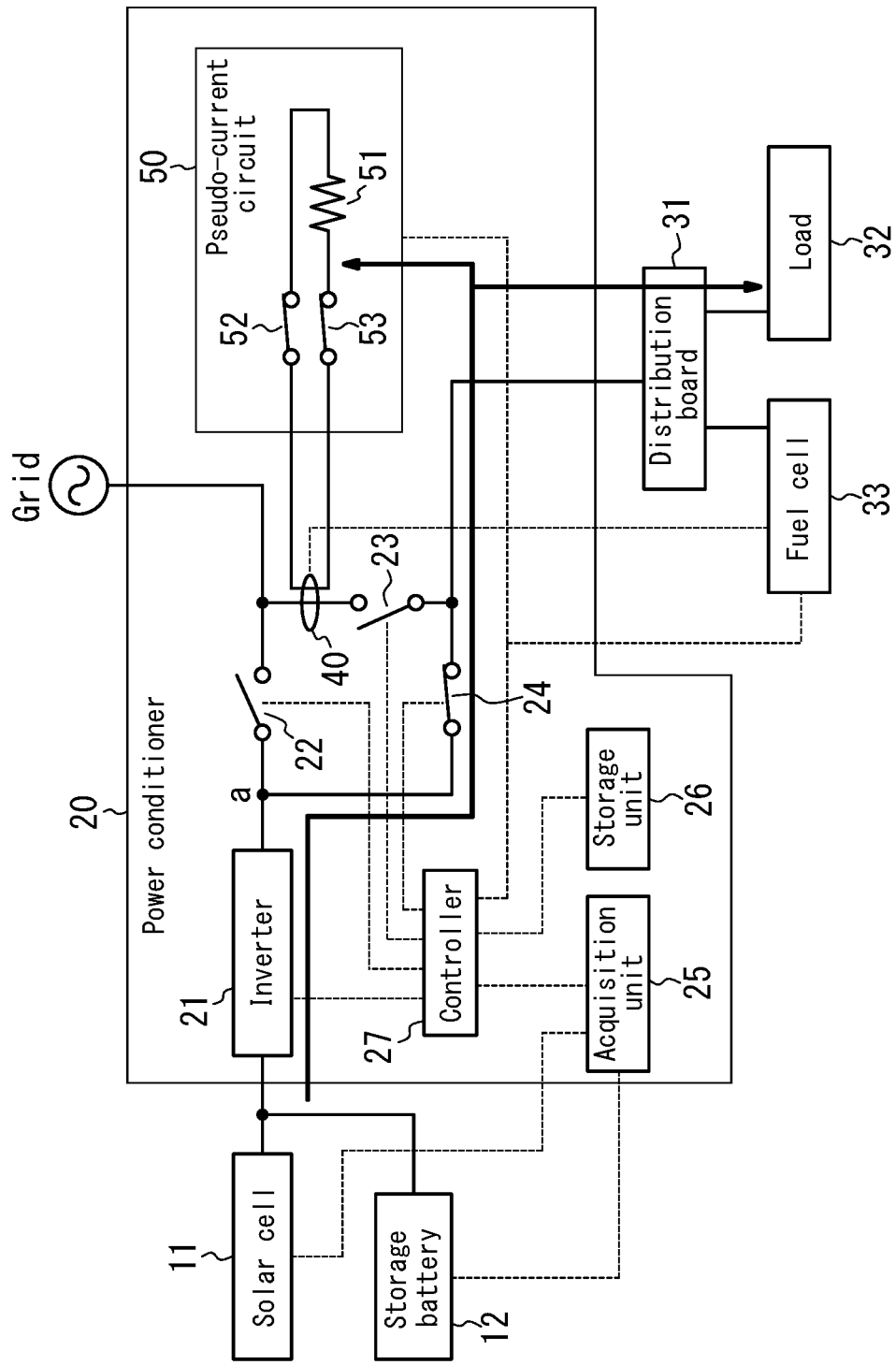
FIG. 4 is a diagram illustrating an example of control during an independent operation.

FIG. 4 is a diagram illustrating an example of the control of the power control system during the independent operation. In FIG. 4, it is assumed that the charging of the storage battery 12 is not completed. In this case, each switch of the power conditioner 20 is controlled in such a manner that the interconnection operation switches 22 and 23 are OFF, and the independent operation switch 24 is ON. Also, each switch of the pseudo-current circuit 50 is controlled in such a manner that the synchronous switch 52 is ON, and the pseudo-current control switch 53 is ON.

During the independent operation, the power conditioner 20 supplies the power of the distributed power sources (the solar cell 11 and the storage battery 12) to the load 32 and the pseudo-current circuit 50 via the independent operation switch 24. Here, there is a concern that, in case of a rapid decrease in the power generation amount of the solar cell 11 or a sharp increase in the load 32 while the charge level of the storage battery 12 is low, limiting the power generation amount of the fuel cell 33 in a manner similar to that during the interconnection operation renders the power generation amount of the fuel cell 33 unable to follow such a decrease or increase as described above, resulting in that the power control system cannot use the load 32.

According to the present embodiment, therefore, based on the latest charge level of the storage battery 12 acquired by the acquisition unit 25, the controller 27 controls the power generation amount of the fuel cell 33. The following is a further detailed description of an example of the control during the independent operation with reference to FIG. 5 and FIG. 6.

Figure 5:
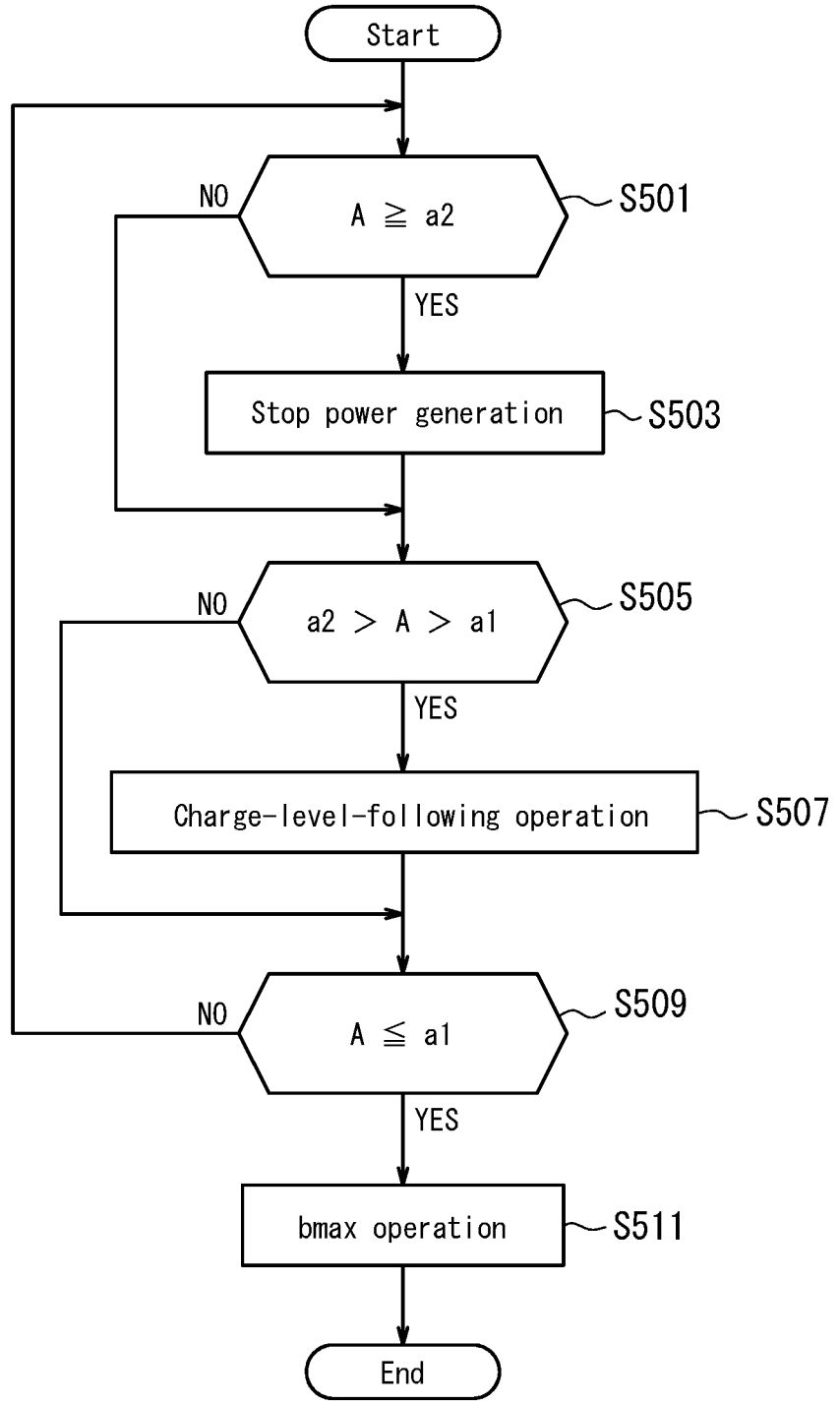
FIG. 5 is a flowchart illustrating the example of the control during the independent operation.
Figure 6:
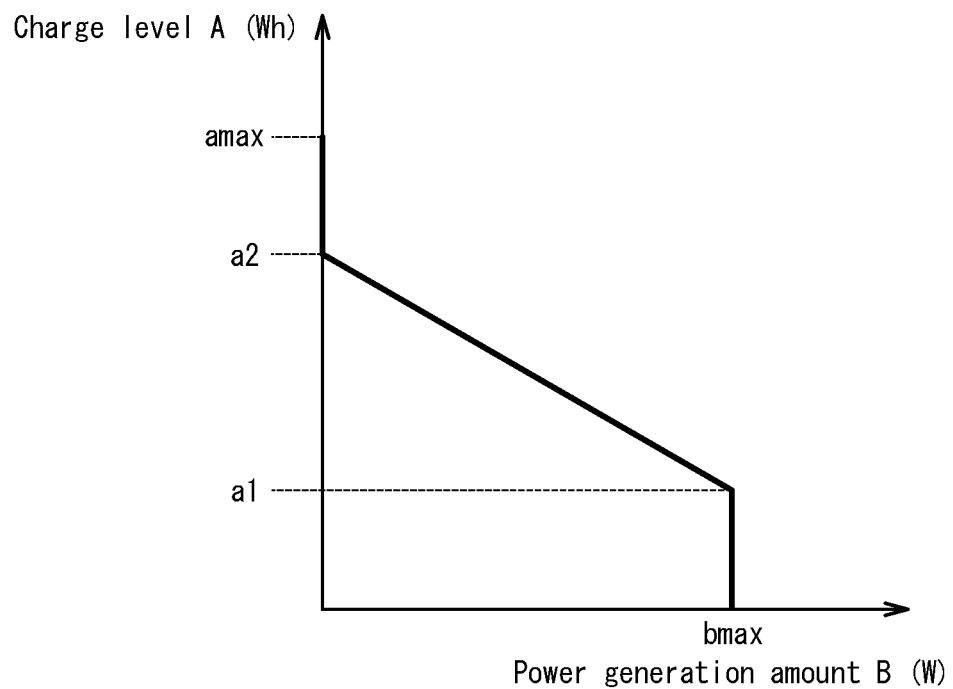
FIG. 6 is a diagram illustrating an example of control of a power generation amount of a fuel cell during the independent operation.

FIG. 5 is a flowchart illustrating the example of the control during the independent operation. FIG. 6 is a diagram illustrating an example of control of the power generation amount of the fuel cell 33 during the independent operation. In FIG. 5, the controller 27 first determines whether a charge level A (Wh) acquired by the acquisition unit 25 is equal to or larger than a threshold a2 (a second threshold) (step S501). The threshold a2 is, for example, a charge level allowing determination that the charging of the storage battery 12 is completed and may be appropriately set to, for example, a value at 75% of a full charge level amax.

At step S501, when the charge level A is determined to be equal to or larger than a2 (YES), the controller 27 turns off the pseudo-current control switch 53 of the pseudo-current circuit 50 and stops a power generation operation of the fuel cell 33 (step S503).

Then, the controller 27 determines whether the charge level A is smaller than the threshold a2 and larger than a threshold a1 (a first threshold) smaller than the threshold a2 (step S505). The threshold a1 may be appropriately set to, based on the power consumption of the load 32, for example, a value at 25% of the full charge level of the storage battery 12. On the other hand, when at step S501 the charge level A is determined to be smaller than the threshold a2 (NO), the controller 27 performs processing at step S505.

At step S505, when the charge level A is determined to satisfy a2>A>a1 (YES), the controller 27, according to the table stored in the storage unit 26, sets a power generation amount B (W) of the fuel cell 33 based on the charge level A and the pseudo current detected by the current sensor 40 and controls the fuel cell 33 to perform the charge-level-following operation (step S507). Then, the controller 27 determines whether the charge level A is equal to or smaller than the threshold a1 (step S509). On the other hand, when it is determined at step S505 that the charge level A does not satisfy a2>A>a1 (NO), the controller 27 executes processing at step S509.

When at step S509 the charge level A is determined to be equal to or smaller than the threshold a1 (YES), the controller 27 sets the power generation amount B to a first predetermined value (step S511) and controls the fuel cell 33 to perform the rated operation at the first predetermined value. Here, the first predetermined value may be set to, for example, a maximum value bmax of the output of the fuel cell 33, e.g., 700 W, or a predetermined value smaller than the maximum value bmax. According to the present embodiment, for convenience sake, the first predetermined value is set to the maximum value bmax. On the other hand, when at step S509 the charge level A is determined to be larger than the threshold a1 (NO), the controller 27 proceeds to step S501 and repeats the processing described above.

Note that, during the independent operation described above, the excess power of the power generation amount B of the fuel cell 33 exceeding the power consumption of the load 32 is used to charge the storage battery 12, as appropriate.

According to the present embodiment, as described above, during the independent operation, the charge level A of the storage battery 12 is checked and, when the charge level A is equal to or larger than the threshold a2 which allows the determination that the storage battery A is fully charged, the power generation operation of the fuel cell 33 is stopped. Thereby, the power control system, in case of the rapid decrease in the output value of the solar cell 11 or the sharp increase in the load 32, may stably supply the power to the load 32 and, also, suppress gas consumption. Also, when the charge level A satisfies a2>A>a1, the power control system controls the power generation amount B of the fuel cell 33 based on the charge level A of the storage battery 12 and the pseudo current detected by the current sensor 40 and, when the charge level A of the storage battery 12 is equal to or smaller than the threshold a1, the power control system controls the fuel cell 33 to perform the rated operation at the maximum power generation amount bmax. Accordingly, in case of the rapid decrease in the output value of the solar cell 11 or the sharp increase in the load 32, the power control system may stably supply the power to the load 32.

Figure 7:
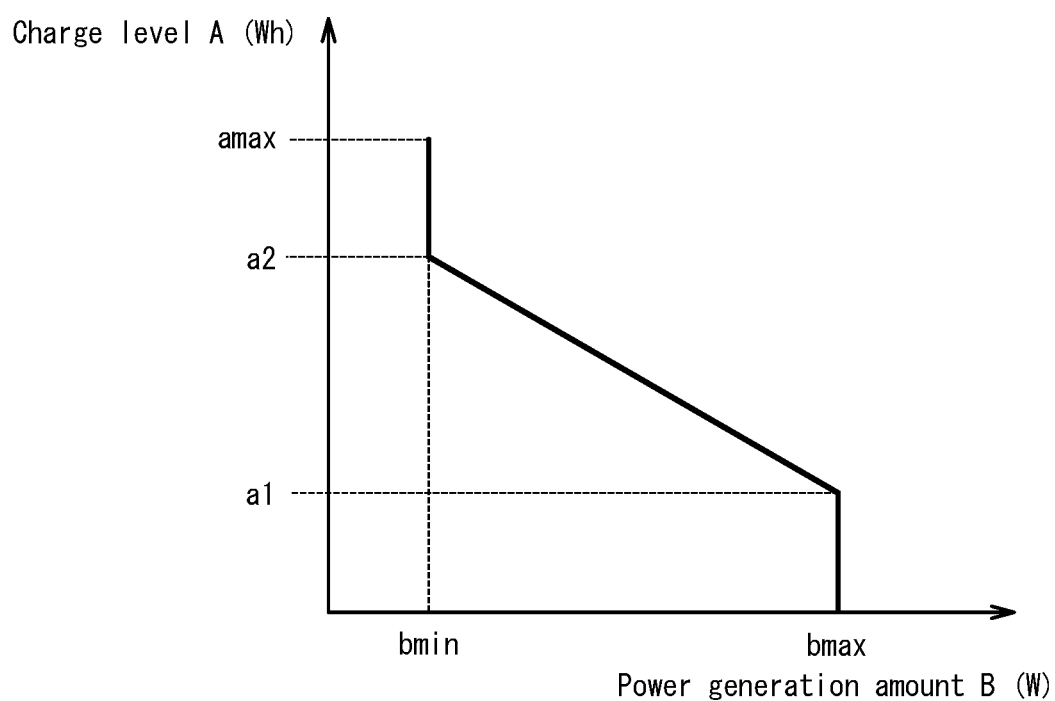
FIG. 7 is a diagram illustrating another example of the control of the power generation amount of the fuel cell during the independent operation.

Or, during the independent operation, the pseudo-current control switch 53 of the pseudo-current circuit 50 may be ON at all times and, at step S501 in FIG. 5, when the charge level A is determined to be equal to or larger than the a2, the power generation B may be set to a second predetermined value smaller than the first predetermined value without stopping the power generation at step S503, and the rated operation of the fuel cell 33 may be performed at the second predetermined value. Here, the second predetermined value may be set to, as illustrated in FIG. 7, a minimum value bmin, e.g., 200 W of the output of the fuel cell 33, or a predetermined value larger than the minimum value bmin. In FIG. 7, for convenience sake, the second predetermined value is set to the minimum value bmin. Also, in FIG. 6 and FIG. 7, during the charge-level-following operation with the charge level A between the threshold a2 and the threshold a1, the power generation amount B of the fuel cell 33 with respect to the charge level A may change linearly, stepwise, or in a curved manner.

Second Embodiment

Next, the power control system according to a second embodiment will be described. In the power control system having the distributed power sources including the solar cell, the storage battery, and the fuel cell, a priority order of the use of the distributed power sources during the independent operation, in consideration of economic aspects from the viewpoint of a user, is generally the solar cell, the storage battery, and the fuel cell in the stated order. However, fixing to this priority order may make the load unusable when the power generation of the solar cell is low and the charge level (the battery power level) of the storage battery is low.

According to the present embodiment, therefore, in the power control system having the configuration illustrated in FIG. 1, the power conditioner 20 constituting the power control apparatus controls the priority order of the use of the distributed power sources (the solar cell 11, the storage battery 12, and the fuel cell 33) during the independent operation based on the output value of the solar cell 11. The following is a description of the operation according to the present embodiment. Note that the operation during the interconnection operation is similar to that of the first embodiment and thus a description thereof will be omitted, and the operation during the independent operation alone will be described.

Figure 8:
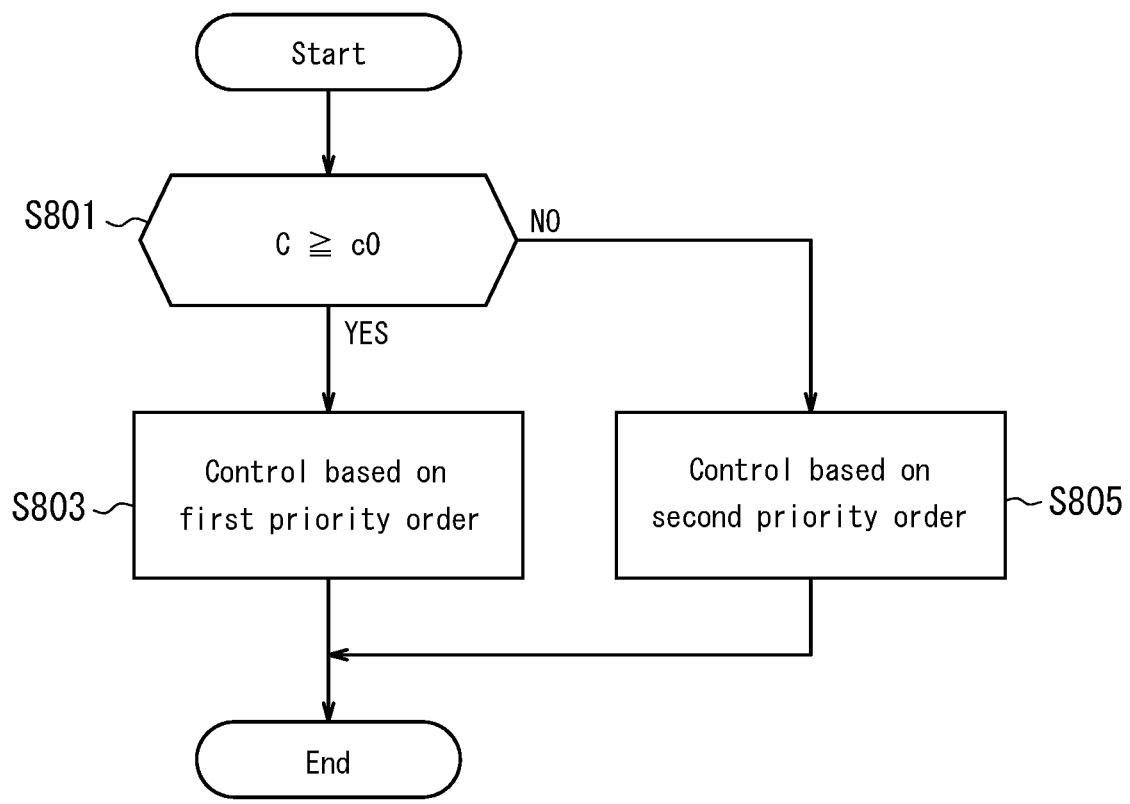
FIG. 8 is a flowchart illustrating an example of control during the independent operation by a power control system according to a second embodiment.

FIG. 8 is a flowchart illustrating an example of the control during the independent operation. First, the controller 27 determines whether an output value C(W) of the solar cell 11 acquired by the acquisition unit 25 is equal to or larger than an order reference value c0 (step S801). The order reference value c0 is, for example, an output value high enough to be able to run the load 32 and may be set appropriately. When C≥c0 (YES) is satisfied as a result, the controller 27 sets the priority order of the use of the distributed power sources to a first priority order, i.e., the solar cell 11, the storage battery 12, and the fuel cell 33 in the stated order, and executes control based on the first priority order (step S803). On the other hand, when C<c0 (NO) is satisfied (NO), the controller 27 sets the priority order of the use of the distributed power sources to a second priority order, i.e., the fuel cell 33 and the storage battery 12 in the stated order, and executes control based on the second priority order (step S805).

During the control based on the first priority order at step S803, the controller 27, for example, performs the independent operation by controlling the power generation amount of the fuel cell 33 in a manner similar to the first embodiment. Also, during the control based on the second priority order at step S805, the controller 27 performs the independent operation by controlling the power generation amount of the fuel cell 33 as illustrated in, for example, FIG. 9 and FIG. 10.

Figure 9:
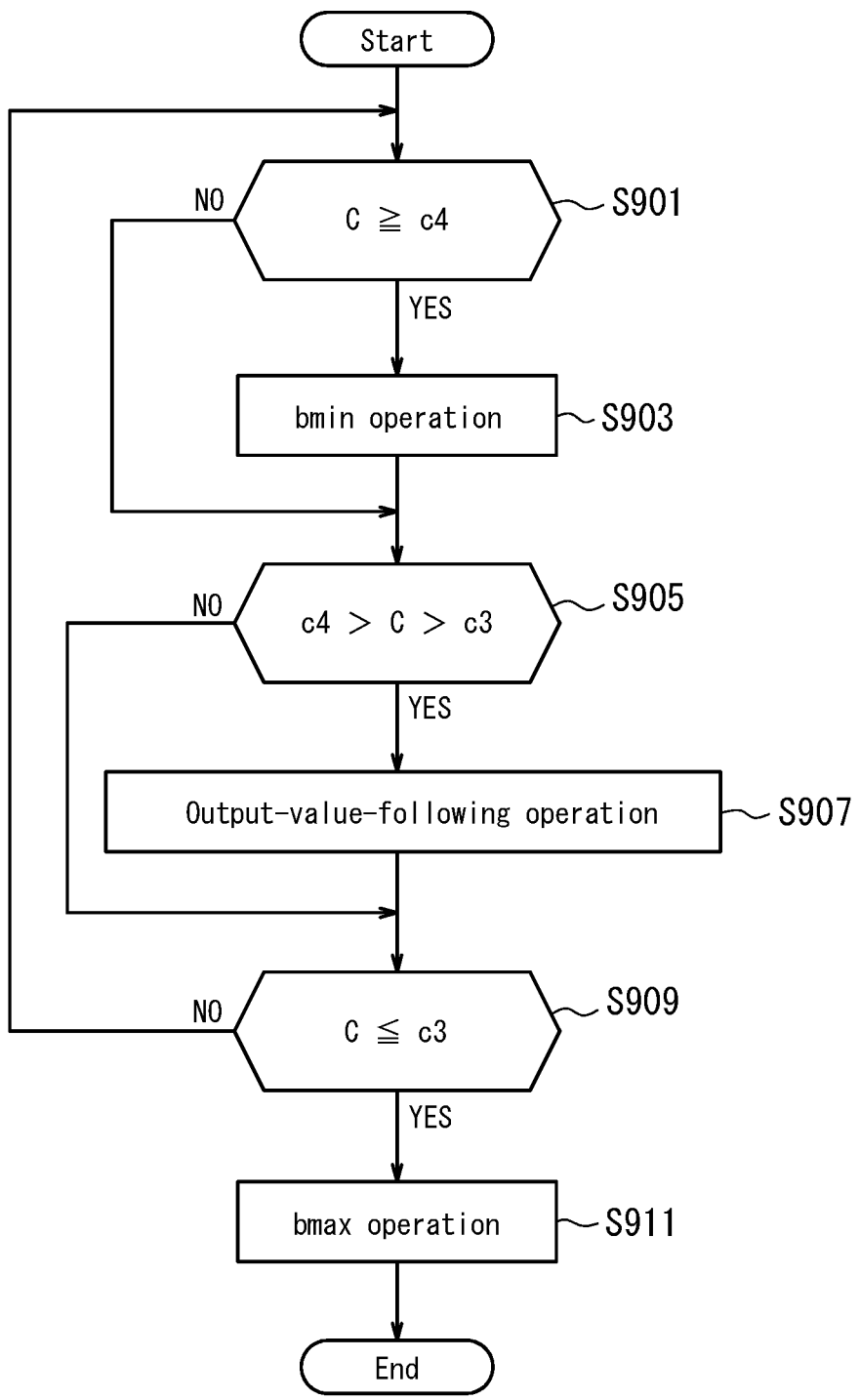
FIG. 9 is a flowchart illustrating an example of control based on a second priority order of FIG. 8.
Figure 10:
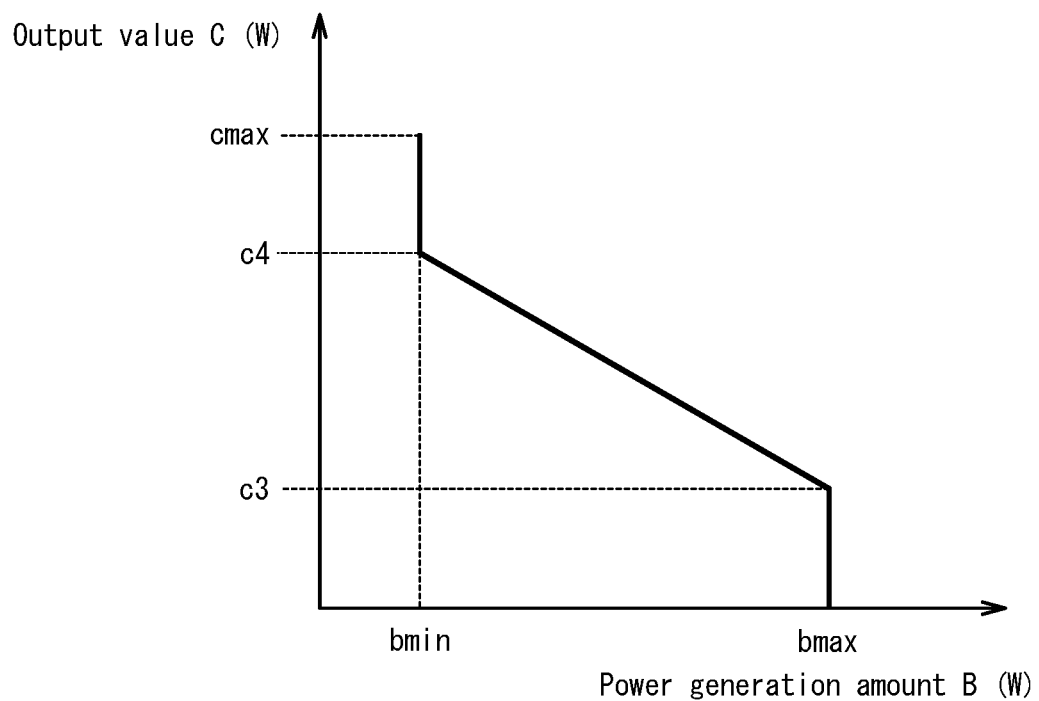
FIG. 10 is a diagram illustrating an example of the control of the power generation amount of the fuel cell based on the second priority order.

FIG. 9 is a flowchart illustrating an example of the control based on the second priority order during the independent operation. FIG. 10 is a diagram illustrating an example of the control of the power generation amount of the fuel cell 33 during the control based on the second priority order. According to the present embodiment, the storage unit 26 stores a table of the power generation amount B (W) of the fuel cell 33 corresponding to the output value C (W) of the solar cell 11. In FIG. 9, the controller 27 first determines whether the output value C of the solar cell 11 acquired by the acquisition unit 25 is equal to or larger than a threshold c4 (a fourth threshold) (step S901). The threshold c4 is, for example, an output value capable of running the load 32 in a substantially stable manner and may be appropriately set to, for example, a value at 75% of a maximum output value cmax of the solar cell 11.

At step S901, when the output value C is determined to be equal to or larger than the c4 (YES), the controller 27 sets the power generation amount B to a fourth predetermined value and performs the rated operation of the fuel cell 33 at the fourth predetermined value (step S903). Here, the fourth predetermined value may be set to be equal to, or different from, the second predetermined value of the first embodiment. According to the present embodiment, for convenience sake, the fourth predetermined value is set to the minimum value bmin, e.g., 200 W, and the rated operation of the fuel cell 33 is performed at the minimum power generation amount bmin.

Then, the controller 27 determines whether the output value C is smaller than the threshold c4 and larger than a threshold c3 (a third threshold) smaller than the threshold c4 (step S905). The threshold c3 is appropriately set based on the power consumption of the load 32 and may be set to, for example, a value at 25% of the maximum output value of the solar cell 11. Note that the order reference value c0 set forth above may be set to an appropriate value between, for example, the threshold c4 and the threshold c3. On the other hand, when at step S901 the output value C is determined to be smaller than the threshold c4 (NO), the controller 27 executes processing at step S905.

When at step S905 the output value C is determined to satisfy c4>C>c3, (YES), the controller 27, in accordance with the table stored in the storage unit 26, sets the power generation amount B of the fuel cell 33 based on the output value C and the pseudo current detected by the current sensor 40 and performs an output-value-following operation of the fuel cell 33 (step S907). Then, the controller 27 determines whether the output value C is equal to or smaller than the threshold c3 (step S909). On the other hand, when it is determined at step S905 that the output value C does not satisfy c4>C>c3 (NO), the controller 27 executes processing at step S909.

When at step S909 the output value C is determined to be equal to or smaller than the threshold c3 (YES), the controller 27 sets the power generation amount B to a third predetermined value and performs the rated operation of the fuel cell 33 at the third predetermined value (step S911). Here, the third predetermined value may be set to be equal to, or different from, the first predetermined value of the first embodiment. According to the present embodiment, for convenience sake, the third predetermined value is set to the maximum value bmax, e.g., 700 W, and the rated operation of the fuel cell 33 is performed at the maximum power generation amount bmax. On the other hand, when at step S909 the output value C is determined to be larger than the threshold c3 (NO), the controller 27 proceeds to step S901 and repeats the processing described above.

Note that, during the independent operation described above, the excess power of the power generation amount B of the fuel cell 33 exceeding the power consumption of the load 32, similarly to the first embodiment, is used to charge the storage battery 12, as appropriate.

According to the present embodiment, as described above, during the independent operation, the output value C of the solar cell 11 is checked, and the output value C and the order reference value c0 are compared to each other. When C≥c0 is satisfied, the distributed power sources are controlled in the first priority order, i.e., the solar cell 11, the storage battery 12, and the fuel cell 33 in the stated order. When C<c0 is satisfied, the distributed power sources are controlled in the second priority order, i.e., the fuel cell 33 and the storage battery 12 in the stated order. During the control based on the second priority order, when the output value C is equal to or larger than the threshold c4 which allows substantially stable running of the load 32, the rated operation of the fuel cell 33 is performed at the minimum power generation amount bmin. Accordingly, the power control system, in case of the rapid decrease in the power generation amount of the solar cell 11 or the sharp increase in the load 32, may stably supply the power to the load 32 without being affected by the charge level of the storage battery 12 and, also, suppress the gas consumption. Also, the power control system, when the output value C satisfies c4>C>c3, controls the power generation amount B based on the output value C and the pseudo current detected by the current sensor 40 and, when the output value C is equal to or smaller than the threshold c3, performs the rated operation of the fuel cell 33 at the maximum power generation amount bmax. Accordingly, the power control system, in case of the rapid decrease in the power generation amount of the solar cell 11 or the sharp increase in the load 32, may stably supply the power to the load 32 without being affected by the charge level of the storage battery 12.

Note that, in FIG. 10, during the output-value-following operation with the output value C between the threshold c4 and the threshold c3, the power generation amount B of the fuel cell 33 with respect to the output value C may change linearly, stepwise, or in a curved manner. Further, the control based on the first priority order at step S803 in FIG. 8 is not limited to the control according to the first embodiment but may be known control based on the priority order.

Although the disclosure herein has been described based on the figures and the embodiments, it is to be understood that those who are ordinarily skilled in the art may easily implement various modifications and changes based on the disclosure herein. Accordingly, such modifications and changes are included in the scope of the disclosure herein. For example, functions and the like included in each constituent, means, and step may be rearranged without logical inconsistency, so as to combine a plurality of means or steps together or to separate them. Also, the power control system of the disclosure herein, by combining the first embodiment and the second embodiment, for example, may control the power generation amount of the fuel cell 33 in consideration of both the output value of the solar cell 11 and the charge level of the storage battery 12. For example, the output value of the solar cell 11 and the charge level of the storage battery 12 may be combined and, based on a comparison between a combined power amount thus obtained and a fifth threshold and a sixth threshold (the fifth threshold<the sixth threshold), the power generation amount of the fuel cell 33 may be controlled in a manner similar to the first embodiment and the second embodiment. That is, when the combined power amount is equal to or smaller than the fifth threshold, the power generation amount of the fuel cell 33 is controlled to meet a predetermined fifth value and, when the combined power amount is equal to or larger than the sixth threshold, the power generation amount of the fuel cell 33 is controlled to meet a sixth predetermined value smaller than the fifth predetermined value.

REFERENCE SIGNS LIST 11 solar cell
12 storage battery
20 power conditioner (power control apparatus)
21 inverter
22, 23 interconnection operation switch
24 independent operation switch
25 acquisition unit
26 storage unit
27 controller
31 distribution board
32 load
33 fuel cell
40 current sensor
50 pseudo-current circuit (pseudo-output unit)
51 pseudo-current load
52 synchronous switch
53 pseudo-current control switch

The invention claimed is:

1. A power control apparatus used in a power control system provided with a fuel cell which generates power while a current sensor is detecting forward power flow, a solar cell, and a storage battery, the power control apparatus comprising:
  a pseudo-output unit configured to generate a pseudo current to be detected by the current sensor as a substitute of the forward power flow from a grid during an independent operation; and a controller configured to control the pseudo-output unit, wherein the controller acquires at least one of a charge level of the storage battery and an output value of the solar cell and, based on at least one of the charge level and the output value, adjusts the pseudo current detected by the current sensor to control a power generation amount of the fuel cell, wherein the fuel cell generates power while the current sensor is detecting forward power flow from the grid and stops power generation when the current sensor detects backward power flow toward the grid, and wherein the controller,
during an interconnection operation, switches on an interconnection operation switch to electrically connect the fuel cell to the grid, and switches off an independent operation switch on an electrical path between the fuel cell and the storage battery, and,
during the independent operation, switches off the interconnection operation switch to electrically disconnect the fuel cell from the grid, and switches on the independent operation switch to electrically connect the fuel cell to the storage battery.

2. The power control apparatus according to claim 1, wherein the controller, when the charge level is equal to or smaller than a first threshold, controls the power generation amount to meet a first predetermined value.

3. The power control apparatus according to claim 2, wherein the controller, when the charge level is equal to or larger than a second threshold larger than the first threshold, controls the power generation amount to meet a second predetermined value smaller than the first predetermined value.

4. The power control apparatus according to claim 2, wherein the controller, when the charge level is equal to or larger than a second threshold larger than the first threshold, stops a power generation operation of the fuel cell.

5. The power control apparatus according to claim 1, wherein the controller, when the output value is equal to or smaller than a third threshold, controls the power generation amount to meet a third predetermined value.

6. The power control apparatus according to claim 5, wherein the controller, when the output value is equal to or larger than a fourth threshold larger than the third threshold, controls the power generation amount to meet a fourth predetermined value smaller than the third predetermined value.

7. The power control apparatus according to claim 1, wherein the controller, when a combined power amount combining the charge level and the output value is equal to or smaller than a fifth threshold, controls the power generation amount to meet a fifth predetermined value.

8. The power control apparatus according to claim 7, wherein the controller, when the combined power amount is equal to or larger than a six threshold larger than the fifth threshold, controls the power generation amount to meet a sixth predetermined value smaller than the fifth predetermined value.

9. The power control apparatus according to claim 1, wherein the controller controls the power generation amount by adjusting the pseudo current in a direction opposite to a direction of the forward power flow.

10. A power control method of a power control system provided with a controller configured to control a fuel cell which generates power while a current sensor is detecting forward power flow, a solar cell, and a storage battery, and also controlling a pseudo-output unit configured to generate a pseudo current to be detected by the current sensor as a substitute of the forward power flow from a grid during an independent operation, the power control method comprising:

during an interconnection operation, switching on an interconnection operation switch to electrically connect the fuel cell to the grid, and switching off an independent operation switch on an electrical path between the fuel cell and the storage battery;

during the independent operation, switching off the interconnection operation switch to electrically disconnect the fuel cell from the grid, and switching on the independent operation switch to electrically connect the fuel cell to the storage battery;

controlling the fuel cell to generate power while the current sensor is detecting forward power flow from the grid, and stop power generation from the fuel cell when the current sensor is detecting backward power flow toward the grid;

a first step of acquiring at least one of a charge level of the storage battery and an output value of the solar cell; and a second step of controlling a power generation amount of the fuel cell based on at least one of the charge level and the output value, by adjusting the pseudo current detected by the current sensor.

11. The power control method according to claim 10, wherein, at the first step, the output value of the solar cell in a state being parallel-off from a grid is acquired, at the second step, the output value acquired at the first step and a predetermined reference value are compared with each other, when the output value is equal to or larger than the predetermined reference value, the fuel cell, the solar cell, and the storage battery are in a first priority order in which the solar cell, the storage battery, and the fuel cell have priorities in the stated order, when the output value is smaller than the predetermined reference value, the fuel cell, the solar cell, and the storage battery are in a second priority order in which the fuel cell and the storage battery have priorities in the stated order, and in a state being parallel-off from the grid, at least when the second priority order is applicable, the power generation amount of the fuel cell is controlled based on the output value acquired at the first step.

12. The power control method according to claim 11, wherein, when the second priority order is applicable and the output value is equal to or smaller than a third threshold, the power generation amount is controlled to meet a third predetermined value.

13. The power control method according to claim 12, wherein, when the second priority order is applicable and the output value is equal to or larger than a fourth threshold larger than the third threshold, the power generation amount is controlled to meet a fourth predetermined value smaller than the third predetermined value.

14. A power control system provided with a controller for controlling a fuel cell which generates power while a current sensor is detecting forward power flow, a solar cell, and a storage battery, and also controlling a pseudo-output unit configured to generate a pseudo current to be detected by the current sensor as a substitute of the forward power flow from a grid during an independent operation, wherein the controller, in a state being parallel-off from a grid, controls a power generation amount of the fuel cell based on at least one of a charge level of the storage battery and an output value of the solar cell, by adjusting the pseudo current detected by the current sensor, and wherein the controller,
  during an interconnection operation, switches on an interconnection operation switch to electrically connect the fuel cell to the grid, and switches off an independent operation switch on an electrical path between the fuel cell and the storage battery,
  during the independent operation, switches off the interconnection operation switch to electrically disconnect the fuel cell from the grid, and switches on the independent operation switch to electrically connect the fuel cell to the storage battery, and
  controls the fuel cell to generate power while the current sensor is detecting forward power flow from the grid, and stop power generation from the fuel cell when the current sensor is detecting backward power flow toward the grid.

15. The power control system according to claim 14, wherein when the charge level is equal to or smaller than a first threshold, the power generation amount is controlled to meet a first predetermined value, when the charge level is equal to or larger than a second threshold larger than the first threshold, the power generation amount is controlled to meet a second predetermined value smaller than the first predetermined value, and when the charge level is larger than the first threshold and smaller than the second threshold, the power generation amount is controlled based on the charge level and the pseudo current.

16. The power control apparatus according to claim 2, wherein the controller, when the output value is equal to or smaller than a third threshold, controls the power generation amount to meet a third predetermined value.

17. The power control apparatus according to claim 3, wherein the controller, when the output value is equal to or smaller than a third threshold, controls the power generation amount to meet a third predetermined value.

18. The power control apparatus according to claim 4, wherein the controller, when the output value is equal to or smaller than a third threshold, controls the power generation amount to meet a third predetermined value.

19. The power control apparatus according to claim 4, wherein the controller, when the charge level is equal to or larger than a second threshold larger than the first threshold, stops a power generation operation of the fuel cell such that the power generation amount becomes zero.

\* \* \* \* \*